US012579002B2

(12) United States Patent
Li

(10) Patent No.: US 12,579,002 B2
(45) Date of Patent: Mar. 17, 2026

(54) PROACTIVE ADAPTATION IN HANDLING SERVICE REQUESTS IN CLOUD COMPUTING SYSTEMS

(71) Applicant: SAP SE, Walldorf (DE)

(72) Inventor: Hui Li, Shanghai (CN)

(73) Assignee: SAP SE, Walldorf (DE)

( * ) Notice: Subject to any disclaimer, the term of this patent is extended or adjusted under 35 U.S.C. 154(b) by 378 days.

(21) Appl. No.: 18/332,860

(22) Filed: Jun. 12, 2023

(65) Prior Publication Data

US 2024/0411608 A1     Dec. 12, 2024

(51) Int. Cl.
*G06F 9/50*          (2006.01)

(52) U.S. Cl.
CPC ................................... *G06F 9/505* (2013.01)

(58) Field of Classification Search
CPC ....................................................... G06F 9/505
USPC ........................................................... 718/105
See application file for complete search history.

(56) References Cited

U.S. PATENT DOCUMENTS

| | | | | | |
|---|---|---|---|---|---|
| 11,153,374 | B1 * | 10/2021 | Yu | ........................ | H04L 67/1008 |
| 2010/0049570 | A1 | 2/2010 | Li et al. | | |
| 2010/0235495 | A1 * | 9/2010 | Petersen | ............. | H04L 63/1458 |
| | | | | | 709/224 |
| 2011/0131336 | A1 * | 6/2011 | Wang | ...................... | H04L 67/02 |
| | | | | | 709/228 |
| 2011/0264482 | A1 | 10/2011 | Rahmouni et al. | | |

| | | | | | |
|---|---|---|---|---|---|
| 2012/0158945 | A1 * | 6/2012 | Goldbach | ............. | G06F 9/5033 |
| | | | | | 709/224 |
| 2013/0297798 | A1 * | 11/2013 | Arisoylu | ............. | H04L 67/1014 |
| | | | | | 709/226 |
| 2014/0331126 | A1 * | 11/2014 | Hunter | .................. | G06F 40/197 |
| | | | | | 715/256 |
| 2015/0309780 | A1 * | 10/2015 | Ruehl | ................. | H04L 67/1095 |
| | | | | | 717/176 |
| 2016/0198453 | A1 * | 7/2016 | Hu | ........................ | H04L 1/1822 |
| | | | | | 370/349 |
| 2019/0102157 | A1 | 4/2019 | Caldato et al. | | |
| 2020/0287964 | A1 * | 9/2020 | Capper | ............... | H04L 67/1029 |
| 2022/0060431 | A1 | 2/2022 | Vadayadiyil et al. | | |
| 2022/0091897 | A1 | 3/2022 | Butterworth et al. | | |
| 2024/0045732 | A1 | 2/2024 | Butterworth et al. | | |
| 2024/0394035 | A1 * | 11/2024 | Verma | ................. | G06F 9/45558 |

(Continued)

OTHER PUBLICATIONS

Sampaio Jr. et al., "Improving Microservice-based Applications with Runtime Placement Adaptation" Journal of Internet Services and Applications 10.1, Dec. 2019, 30 pages.

(Continued)

*Primary Examiner* — Adam Lee
(74) *Attorney, Agent, or Firm* — Fish & Richardson P.C.

(57)          ABSTRACT

Methods, systems, and computer-readable storage media for receiving a first request parameter for each of the plurality of tenants, receiving a second request parameter for each of the plurality of tenants, assigning the plurality of tenants to an N plurality of tenant groups based on the first request parameter for each of the plurality of tenants, assigning each tenant in the N plurality of tenant groups to a server group in an M plurality of server groups based on the second request parameter for each of the plurality of tenants, and directing, by a load balancer, tenant requests of tenants in the plurality of tenants to servers based on the M plurality of server groups.

17 Claims, 12 Drawing Sheets

(56)        References Cited

U.S. PATENT DOCUMENTS

2025/0190266 A1      6/2025  Li

OTHER PUBLICATIONS

Wikipedia.org [online], "Hungarian algorithm" created on Sep. 2005, retrieved on Dec. 8, 2023, retrieved from URL <https://en.wikipedia.org/wiki/Hungarian_algorithm>, 14 pages.

Wikipedia.org [online], "Jaccard index" created on Jul. 2005, retrieved on Dec. 8, 2023, retrieved from URL <https://en.wikipedia.org/wiki/Jaccard_index#Tanimoto_similarity_and_distance>, 10 pages.

U.S. Appl. No. 18/534,877, Reserving Computing Resources in Cloud Computing Environments, filed Dec. 11, 2023, 37 pages.

U.S. Appl. No. 19/422,557, Li, filed Dec. 17, 2025.

Wikipedia.org [online], "Gale-Shapley algorithm" created on Apr. 2010, retrieved on Jul. 26, 2024, retrieved from URL <https://en.wikipedia.org/wiki/Gale%E2%80%93Shapley_algorithm>, 6 pages.

Wikipedia.org [online], "Simulated annealing" created on Jan. 2003, retrieved on Oct. 13, 2025, retrieved from URL <https://en.wikipedia.org/wiki/Simulated_annealing>, 11 pages.

Wikipedia.org [online], "Stable marriage problem" created on May 2004, retrieved on Jul. 26, 2024, retrieved from URL <https://en.wikipedia.org/wiki/Stable_marriage_problem>, 6 pages.

Xu et al., "Anchor: A Stable Matching Framework for Managing Cloud Resources" Computer Science, 2011, 14 pages.

* cited by examiner

*400*

| Tenant | tReqCnt (billion) | tPkTime (month) |
|---|---|---|
| tenant0 | 46 | 11 |
| tenant1 | 10 | 4 |
| tenant2 | 6 | 8 |
| tenant3 | 15 | 10 |
| tenant4 | 33 | 6 |
| tenant5 | 1 | 12 |
| tenant6 | 42 | 4 |
| tenant7 | 34 | 10 |
| tenant8 | 31 | 11 |
| tenant9 | 4 | 7 |
| tenant10 | 13 | 11 |
| tenant11 | 35 | 1 |
| tenant12 | 37 | 9 |
| tenant13 | 25 | 11 |
| tenant14 | 25 | 8 |
| tenant15 | 11 | 9 |
| tenant16 | 42 | 11 |
| tenant17 | 8 | 12 |
| tenant18 | 33 | 9 |
| tenant19 | 30 | 11 |
| tenant20 | 10 | 12 |
| ... | ... | ... |
| tenant31 | 21 | 9 |
| tenant32 | 6 | 11 |
| tenant33 | 20 | 10 |
| tenant34 | 40 | 11 |
| tenant35 | 29 | 1 |
| tenant36 | 15 | 7 |
| tenant37 | 38 | 12 |
| tenant38 | 5 | 10 |
| tenant39 | 6 | 10 |
| tenant40 | 37 | 5 |
| tenant41 | 25 | 4 |
| tenant42 | 34 | 8 |
| tenant43 | 14 | 3 |
| tenant44 | 45 | 12 |
| tenant45 | 19 | 2 |
| tenant46 | 47 | 6 |
| tenant47 | 34 | 6 |
| tenant48 | 11 | 8 |
| tenant49 | 39 | 10 |

402

| Tenant Group | Tenant | tReqCnt (billion) | tPkTime (month) |
|---|---|---|---|
| tenantGroup0 | tenant2 | 6 | 8 |
| | tenant5 | 1 | 12 |
| | tenant9 | 4 | 7 |
| | tenant17 | 8 | 12 |
| | tenant32 | 6 | 11 |
| | tenant38 | 5 | 10 |
| | tenant39 | 6 | 10 |
| tenantGroup1 | tenant1 | 10 | 4 |
| | tenant3 | 15 | 10 |
| | tenant10 | 13 | 11 |
| | tenant15 | 11 | 9 |
| | tenant20 | 10 | 12 |
| | tenant21 | 14 | 11 |
| | tenant25 | 10 | 1 |
| | tenant28 | 18 | 11 |
| | tenant36 | 15 | 7 |
| | tenant43 | 14 | 3 |
| | tenant48 | 11 | 8 |
| tenantGroup2 | tenant13 | 25 | 11 |
| | tenant14 | 28 | 8 |
| | tenant23 | 22 | 10 |
| | tenant26 | 21 | 2 |
| | tenant27 | 28 | 12 |
| | tenant31 | 21 | 9 |
| | tenant33 | 20 | 10 |
| | tenant41 | 25 | 4 |
| | tenant45 | 19 | 2 |
| ... | ... | ... | ... |
| tenantGroup4 | tenant0 | 46 | 11 |
| | tenant6 | 42 | 4 |
| | tenant16 | 42 | 11 |
| | tenant22 | 39 | 4 |
| | tenant24 | 47 | 7 |
| | tenant30 | 46 | 7 |
| | tenant34 | 40 | 11 |
| | tenant37 | 38 | 12 |
| | tenant44 | 45 | 12 |
| | tenant46 | 47 | 5 |
| | tenant49 | 39 | 10 |

*FIG. 4B*

404

| Tenant Group | Tenant | tReqCnt (billion) | tPkTime (month) |
|---|---|---|---|
| tenantGroup0 | tenant9 | 4 | 7 |
| | tenant2 | 6 | 8 |
| | tenant38 | 5 | 10 |
| | tenant39 | 6 | 10 |
| | tenant32 | 6 | 11 |
| | tenant5 | 1 | 12 |
| | tenant17 | 8 | 12 |
| tenantGroup1 | tenant25 | 10 | 1 |
| | tenant43 | 14 | 3 |
| | tenant1 | 10 | 4 |
| | tenant36 | 16 | 7 |
| | tenant48 | 11 | 8 |
| | tenant15 | 11 | 9 |
| | tenant3 | 16 | 10 |
| | tenant10 | 13 | 11 |
| | tenant21 | 14 | 11 |
| | tenant28 | 18 | 11 |
| | tenant20 | 10 | 12 |
| tenantGroup2 | tenant26 | 21 | 2 |
| | tenant45 | 19 | 2 |
| | tenant41 | 25 | 4 |
| | tenant14 | 26 | 8 |
| | tenant31 | 21 | 9 |
| | tenant23 | 22 | 10 |
| | tenant33 | 20 | 10 |
| | tenant13 | 25 | 11 |
| | tenant27 | 28 | 12 |
| ... | ... | ... | ... |
| tenantGroup4 | tenant6 | 42 | 4 |
| | tenant22 | 39 | 4 |
| | tenant46 | 47 | 5 |
| | tenant24 | 47 | 7 |
| | tenant30 | 46 | 7 |
| | tenant49 | 39 | 10 |
| | tenant0 | 46 | 11 |
| | tenant16 | 42 | 11 |
| | tenant34 | 40 | 11 |
| | tenant37 | 38 | 12 |
| | tenant44 | 45 | 12 |

| Server Group | Tenant | tReqCnt (billion) | tPkTime (month) |
|---|---|---|---|
| serverGroup0 | tenant9 | 4 | 7 |
| | tenant5 | 1 | 12 |
| | tenant36 | 15 | 7 |
| | tenant21 | 14 | 11 |
| | tenant41 | 25 | 4 |
| | tenant13 | 25 | 11 |
| | tenant47 | 34 | 5 |
| | tenant7 | 34 | 10 |
| | tenant22 | 39 | 4 |
| | tenant0 | 46 | 11 |
| serverGroup1 | tenant2 | 6 | 8 |
| | tenant17 | 8 | 12 |
| | tenant48 | 11 | 8 |
| | tenant28 | 18 | 11 |
| | tenant14 | 26 | 8 |
| | tenant27 | 28 | 12 |
| | tenant4 | 33 | 6 |
| | tenant8 | 31 | 11 |
| | tenant46 | 47 | 5 |
| | tenant16 | 42 | 11 |
| ... | ... | ... | ... |
| serverGroup3 | tenant39 | 6 | 10 |
| | tenant43 | 14 | 3 |
| | tenant3 | 15 | 10 |
| | tenant26 | 21 | 2 |
| | tenant23 | 22 | 10 |
| | tenant35 | 29 | 1 |
| | tenant12 | 37 | 9 |
| | tenant29 | 37 | 12 |
| | tenant30 | 46 | 7 |
| | tenant37 | 38 | 12 |
| serverGroup4 | tenant32 | 6 | 11 |
| | tenant1 | 10 | 4 |
| | tenant10 | 13 | 11 |
| | tenant45 | 19 | 2 |
| | tenant33 | 20 | 10 |
| | tenant40 | 37 | 5 |
| | tenant18 | 33 | 9 |
| | tenant6 | 42 | 4 |
| | tenant49 | 39 | 10 |
| | tenant44 | 45 | 12 |

*FIG. 4D*

| Tenant | tReqCnt (million) | tPkTime (hour) |
|--------|-------------------|----------------|
| tenant0 | 8 | 10 |
| tenant1 | 50 | 7 |
| tenant2 | 49 | 17 |
| tenant3 | 49 | 0 |
| tenant4 | 29 | 14 |
| tenant5 | 26 | 10 |
| tenant6 | 27 | 8 |
| tenant7 | 24 | 13 |
| tenant8 | 69 | 12 |
| tenant9 | 59 | 18 |
| tenant10 | 77 | 0 |
| tenant11 | 24 | 5 |
| tenant12 | 15 | 7 |
| tenant13 | 31 | 13 |
| tenant14 | 12 | 18 |
| tenant15 | 52 | 9 |
| tenant16 | 41 | 7 |
| ... | ... | ... |
| tenant28 | 55 | 9 |
| tenant29 | 43 | 19 |
| tenant30 | 95 | 23 |
| tenant31 | 33 | 15 |
| tenant32 | 64 | 8 |
| tenant33 | 42 | 7 |
| tenant34 | 20 | 2 |
| tenant35 | 17 | 19 |
| ... | ... | ... |
| tenant61 | 95 | 22 |
| tenant62 | 99 | 11 |
| tenant63 | 78 | 9 |
| tenant64 | 83 | 7 |
| tenant65 | 18 | 2 |
| tenant66 | 88 | 22 |
| tenant67 | 68 | 10 |
| tenant68 | 50 | 22 |
| tenant69 | 51 | 14 |
| tenant70 | 8 | 7 |
| tenant71 | 95 | 10 |
| tenant72 | 81 | 12 |
| tenant73 | 90 | 20 |
| tenant74 | 81 | 6 |
| tenant75 | 46 | 3 |
| tenant76 | 90 | 12 |
| tenant77 | 5 | 18 |
| tenant78 | 68 | 2 |
| tenant79 | 78 | 20 |

| Tenant Group | Tenant | tReqCnt (million) | tPkTime (hour) |
|---|---|---|---|
| tenantGroup0 | tenant0 | 8 | 10 |
| | tenant14 | 12 | 18 |
| | tenant43 | 1 | 13 |
| | tenant51 | 4 | 14 |
| | tenant53 | 12 | 11 |
| | tenant57 | 4 | 17 |
| | tenant70 | 8 | 7 |
| | tenant77 | 5 | 18 |
| tenantGroup1 | tenant7 | 24 | 13 |
| | tenant11 | 24 | 5 |
| | tenant12 | 15 | 7 |
| | tenant18 | 18 | 16 |
| | tenant26 | 15 | 16 |
| | tenant27 | 15 | 7 |
| | tenant34 | 20 | 2 |
| | tenant35 | 17 | 19 |
| | tenant54 | 20 | 12 |
| | tenant58 | 20 | 9 |
| | tenant65 | 18 | 2 |
| tenantGroup2 | tenant4 | 29 | 14 |
| | tenant5 | 26 | 10 |
| | tenant6 | 27 | 8 |
| | tenant13 | 31 | 13 |
| | tenant17 | 26 | 0 |
| | tenant26 | 28 | 18 |
| | tenant31 | 33 | 15 |
| | tenant38 | 31 | 8 |
| | tenant69 | 34 | 18 |
| ... | ... | ... | ... |
| tenantGroup7 | tenant22 | 92 | 16 |
| | tenant30 | 95 | 23 |
| | tenant37 | 94 | 13 |
| | tenant41 | 88 | 14 |
| | tenant47 | 89 | 22 |
| | tenant52 | 99 | 2 |
| | tenant60 | 95 | 12 |
| | tenant61 | 95 | 22 |
| | tenant62 | 99 | 11 |
| | tenant66 | 88 | 22 |
| | tenant71 | 95 | 10 |
| | tenant73 | 90 | 20 |
| | tenant76 | 90 | 12 |

| Tenant Group | Tenant | tReqCnt (million) | tPkTime (hour) |
|---|---|---|---|
| tenantGroup0 | tenant70 | 8 | 7 |
| | tenant0 | 8 | 10 |
| | tenant63 | 12 | 11 |
| | tenant43 | 1 | 13 |
| | tenant51 | 4 | 14 |
| | tenant57 | 4 | 17 |
| | tenant14 | 12 | 18 |
| | tenant77 | 5 | 18 |
| tenantGroup1 | tenant34 | 20 | 2 |
| | tenant65 | 18 | 2 |
| | tenant11 | 24 | 5 |
| | tenant12 | 15 | 7 |
| | tenant27 | 15 | 7 |
| | tenant58 | 20 | 9 |
| | tenant54 | 20 | 12 |
| | tenant7 | 24 | 13 |
| | tenant18 | 18 | 16 |
| | tenant25 | 15 | 16 |
| | tenant35 | 17 | 19 |
| . . . | . . . | . . . | . . . |
| tenantGroup6 | tenant10 | 77 | 0 |
| | tenant55 | 84 | 2 |
| | tenant50 | 79 | 3 |
| | tenant74 | 81 | 6 |
| | tenant23 | 86 | 7 |
| | tenant44 | 75 | 7 |
| | tenant64 | 83 | 7 |
| | tenant63 | 78 | 9 |
| | tenant72 | 81 | 12 |
| | tenant79 | 78 | 20 |
| tenantGroup7 | tenant52 | 99 | 2 |
| | tenant71 | 95 | 10 |
| | tenant62 | 99 | 11 |
| | tenant60 | 95 | 12 |
| | tenant76 | 90 | 12 |
| | tenant37 | 94 | 13 |
| | tenant41 | 88 | 14 |
| | tenant22 | 92 | 16 |
| | tenant73 | 90 | 20 |
| | tenant47 | 89 | 22 |
| | tenant61 | 95 | 22 |
| | tenant66 | 88 | 22 |
| | tenant30 | 95 | 23 |

*FIG. 5C*

| Server Group | Tenant | tReqQnt (million) | tPkTime (hour) |
|---|---|---|---|
| serverGroup0 | tenant70 | 8 | 7 |
| | tenant14 | 12 | 18 |
| | tenant27 | 15 | 7 |
| | tenant35 | 17 | 19 |
| | tenant4 | 29 | 14 |
| | tenant75 | 46 | 3 |
| | tenant29 | 43 | 19 |
| | tenant39 | 58 | 7 |
| | tenant68 | 80 | 22 |
| | tenant67 | 68 | 10 |
| | tenant74 | 81 | 6 |
| | tenant79 | 78 | 20 |
| | tenant37 | 94 | 13 |
| | tenant66 | 88 | 22 |
| serverGroup1 | tenant0 | 8 | 10 |
| | tenant77 | 5 | 18 |
| | tenant58 | 20 | 9 |
| | tenant17 | 26 | 0 |
| | tenant31 | 33 | 15 |
| | tenant16 | 41 | 7 |
| | tenant56 | 44 | 20 |
| | tenant15 | 52 | 9 |
| | tenant42 | 66 | 1 |
| | tenant8 | 69 | 12 |
| | tenant23 | 86 | 7 |
| | tenant52 | 99 | 2 |
| | tenant41 | 88 | 14 |
| | tenant30 | 96 | 23 |
| ... | ... | ... | ... |
| serverGroup5 | tenant57 | 4 | 17 |
| | tenant12 | 15 | 7 |
| | tenant25 | 15 | 16 |
| | tenant13 | 31 | 13 |
| | tenant40 | 43 | 3 |
| | tenant2 | 49 | 17 |
| | tenant1 | 50 | 7 |
| | tenant9 | 59 | 18 |
| | tenant20 | 74 | 10 |
| | tenant50 | 79 | 3 |
| | tenant72 | 81 | 12 |
| | tenant76 | 90 | 12 |
| | tenant61 | 95 | 22 |

PROACTIVE ADAPTATION IN HANDLING SERVICE REQUESTS IN CLOUD COMPUTING SYSTEMS

BACKGROUND

Enterprises can use enterprise applications to support and execute operations. Enterprise applications can be deployed in cloud computing environments, which includes execution of the enterprise applications within a data center of a cloud-computing provider (e.g., as part of an infrastructure-as-a-service (IaaS) offering). Cloud computing can be described as Internet-based computing that provides shared computer processing resources, and data to computers and other devices on demand. Users can establish respective sessions, during which processing resources, and bandwidth are consumed. During a session, for example, a user is provided on-demand access to a shared pool of configurable computing resources (e.g., computer networks, servers, storage, applications, and services). In some instances, clients (e.g., client-side computing devices) transmit requests to a cloud computing environment, which requests are routed to a server for processing.

SUMMARY

Implementations of the present disclosure are directed to request handling in cloud computing environments. More particularly, implementations of the present disclosure are directed to load balancing of tenant requests to application servers in a cloud computing environment by assigning tenants to application server groups.

In some implementations, actions include receiving a first request parameter for each of the plurality of tenants, receiving a second request parameter for each of the plurality of tenants, assigning the plurality of tenants to an N plurality of tenant groups based on the first request parameter for each of the plurality of tenants, assigning each tenant in the N plurality of tenant groups to a server group in an M plurality of server groups based on the second request parameter for each of the plurality of tenants, and directing, by a load balancer, tenant requests of tenants in the plurality of tenants to servers based on the M plurality of server groups. Other implementations of this aspect include corresponding systems, apparatus, and computer programs, configured to perform the actions of the methods, encoded on computer storage devices.

These and other implementations can each optionally include one or more of the following features: the first request parameter is a request count for each of the plurality of tenants over a period of time; the second request parameter is a peak time of requests for each tenant over a period of time; assigning the plurality of tenants to the N plurality of tenant groups comprises, for each tenant (p), determining a tenant group (i) as:

$$i = \mathrm{MIN}\left\{ RND_{down}\left(\frac{tReqCnt_p * N}{T_C}\right), N - 1 \right\}$$

where $tReqCnt_p$ is the first request parameter for the tenant (p) and $T_C$ is a largest (MAX) tenant request count for all tenants in the plurality of tenants; assigning the plurality of tenants from the N plurality of tenant groups to the M plurality of server groups comprises, for each tenant (j)

within a tenant group (i), determining a server group (k) as j modulo M; a value of N is determined, such that numbers of tenants in each tenant group are substantially equal; and actions further include receiving a request from a first tenant of the plurality of tenants, determining a first server group from the M plurality of server groups to which the first tenant is assigned, and distributing the request from the first tenant to the first server group.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIGS. 4A-4D depict tables representing an example assignment of tenants to server groups in accordance with implementations of the present disclosure.

FIGS. 5A-5D depict tables representing another assignment of tenants to server groups in accordance with implementations of the present disclosure.

Like reference symbols in the various drawings indicate like elements.

DETAILED DESCRIPTION

Figure 1:
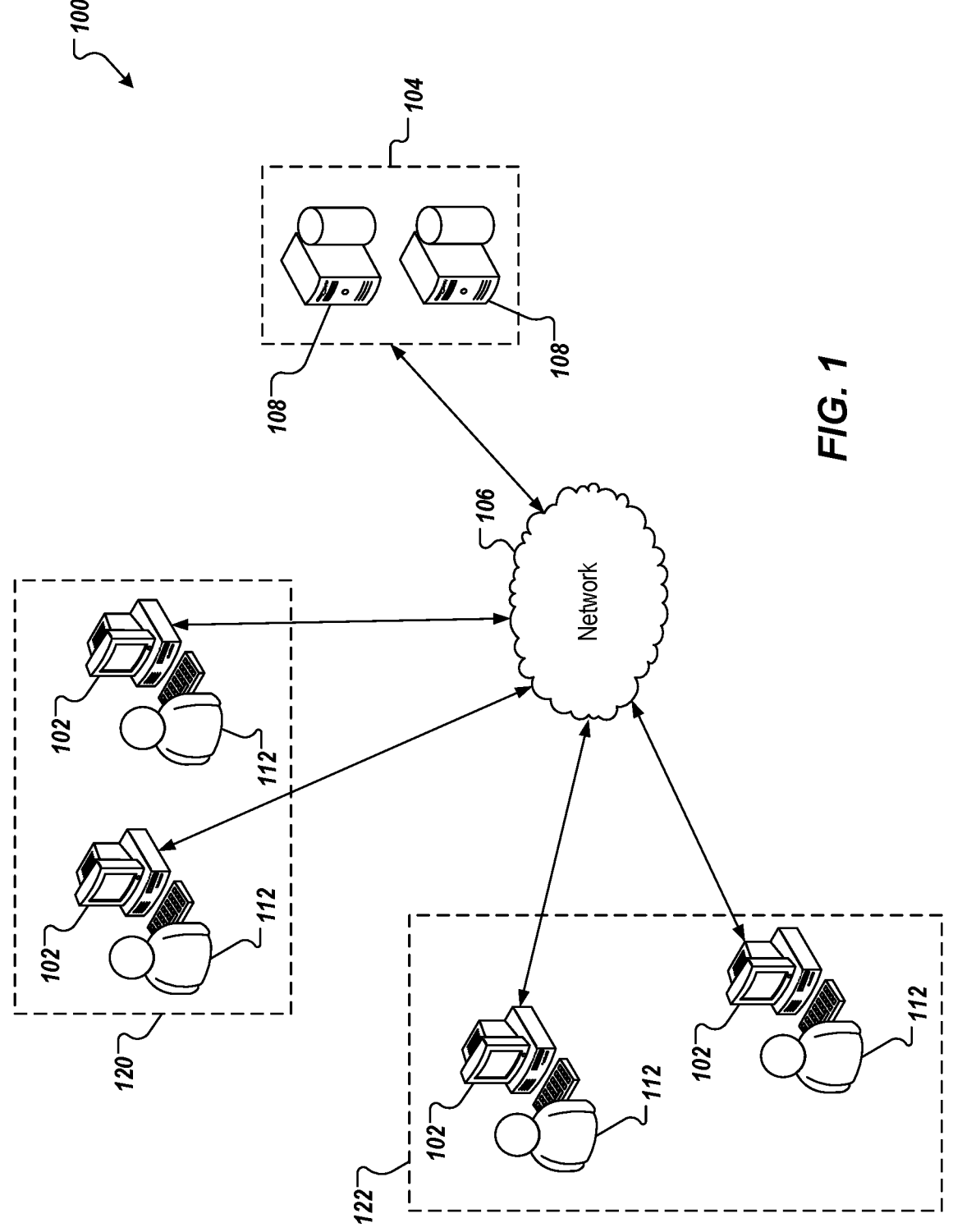
FIG. 1 depicts an example architecture that can be used to execute implementations of the present disclosure.

Implementations of the present disclosure are directed to request handling in cloud computing environments. More particularly, implementations of the present disclosure are directed to load balancing of tenant requests to application servers in a cloud computing environment by assigning tenants to application server groups and thereby minimize the probability that a single application server will experience degraded performance (e.g., increased latency in responding to tenant requests) if it has too many tenant requests to address. Implementations can include actions of receiving a first request parameter for each of the plurality of tenants, receiving a second request parameter for each of the plurality of tenants, assigning the plurality of tenants to an N plurality of tenant groups based on the first request parameter for each of the plurality of tenants, assigning each tenant in the N plurality of tenant groups to a server group in an M plurality of server groups based on the second request parameter for each of the plurality of tenants, and directing, by a load balancer, tenant requests of tenants in the plurality of tenants to servers based on the M plurality of server groups.

To provide further context for implementations of the present disclosure, and as introduced above, enterprises can use enterprise applications to support and execute operations. Enterprise applications can be deployed in cloud computing environments, which includes execution of the enterprise applications within a data center of a cloud-computing provider (e.g., as part of a infrastructure-as-a-service (IaaS) and/or a software-as-a-service (SaaS) offering). Cloud computing can be described as Internet-based computing that provides shared computer processing resources, and data to computers and other devices on demand.

Enterprise applications can be deployed for access by multiple tenants. In some examples, each tenant can include an enterprise that is able to access the enterprise application in the cloud computing environment. For example, clients of tenants can establish respective sessions, during which processing resources, and bandwidth are consumed. A client can include, for example and without limitation, a user (e.g., using a tenant-side computing device) of an application (e.g., executing on a tenant-side computing device). During a session, for example, a client is provided on-demand access to the enterprise application, which is executed using a shared pool of configurable computing resources (e.g., computer networks, servers, storage, applications, and services).

Each session can include static data and session-specific data. In some examples, the static data is specific to a tenant. The application server stores the static data of the tenant, such that, when a session for the tenant is established, the static data for that tenant can be used during the session. Example static data can include, without limitation, configuration information and logic information. Example configuration information can include, without limitation, language, location, currency, time-date format, and the like. Example logic information can include, without limitation, a data model of business logic. For example, and without limitation, if a SaaS environment provides a restful or Odata web service, the static data of a tenant contains the definition of all resources, the definition of all exposed APIs, the content of Odata metadata, the content of swagger document, the logic of permission check, and the like.

For example, and without limitation, the following example OData metadata can be provided for a tenant:

---

Listing 1: Example OData Metadata

```
<EntityType Name="User">
   <Key>
      <PropertyRef Name="userId" />
   </Key>
   <Property Name="userId" Type="String" required="true"
creatable="true" updatable="true" visible="true"
sortable="true" filterable="true" maxLength="255"/>
   <Property Name="username " Type="String"
```

4

---

Listing 1: Example OData Metadata

```
required="true" creatable="true" updatable="true"
visible="true" sortable=" true" filterable="true"
maxLength="255" />
   <Property Name="firstName" Type="String"
required="true" creatable="true" updatable="true"
visible="true" sortable="true " filterable=" true"
maxLength="255" />
   <Property Name="lastName" Type="String"
required="true" creatable="true" updatable="true"
visible="true" sortable=" true " filterable="true"
maxLength="255" />
   ...
</EntityType>
<EntityType Name="Photo">
   <Key>
      <PropertyRef Name="photoId" />
   </Key>
   <Property Name="photoId" Type="long" required="true"
creatable="true" updatable="true" visible="true"
sortable="true" filterable="true" />
   <Property Name="userId" Type="String" required="true"
creatable="true" updatable="true" visible="true"
sortable="true" filterable="true" maxLength="255" />
   <Property Name="photoType" Type="integer"
required="true" creatable="true" updatable="true"
visible="true" sortable=" true" filterable="true" />
   <NavigationProperty Name="userNav" required="false
creatable="false" updatable="false" upsertable="false"
sortable="true" filterable="true" Relationship="
Photo_And_User" FromRole="photoEnd" ToRole="userEnd" />
   ...
</EntityType>
...
```

---

In the example Odata Metadata of Listing 1 (provided in extensible markup language (XML), entities of User and Photo are defined. A single tenant may have tens to hundreds to thousands of entities. Supposing, for example, Java is used in the program, then not only the XML content, but also the corresponding Java objects which are translated by from XML content, and Java codes to produce and consume the entities are all included as static data and need to store in the memory (e.g., the cache).

Multiple instances of the enterprise application can be executed on respective application servers within the cloud computing environment. For example, multiple tenants can access an enterprise resource planning (ERP) system, wherein instances of the ERP system are executed on multiple application servers. That is, multiple application servers execute respective instances of the same application (e.g., ERP system). As such, clients (e.g., tenant-side computing devices) transmit requests to the cloud computing environment, which requests are routed to one of the application servers for processing. In traditional cloud computing environments, a load balancer (e.g., executing at a gateway of the cloud computing environment) dispatches requests to application servers using a dispatch policy. Example dispatch policies include, without limitation, round-robin scheduling and modified round-robin scheduling. Such scheduling policies, however, are at the request-level. Consequently, when a request hits the gateway of the cloud computing environment, the gateway will redirect the request to an application server based on the dispatch policy without regard to the particular tenant that the request originated from. In such scenarios, it is possible for all or a majority of the application servers to be receiving client requests from a single tenant where such a distribution outcome is not efficient for the cloud computing environment.

Because of this, traditional cloud computing environments require every application server to store static data for all tenants that can interact with the application server. That is, because requests for any single tenant can be distributed to any of the application servers, every application server must store the static data of every tenant. This can require each application server to store a significant amount of data (e.g., in cache memory), as each stores static data for all tenants. Further, the cache can be periodically generated and cleaned for storage of the static data for each tenant. These activities consume processing power and memory.

For purposes of non-limiting illustration, an example of one hundred (100) tenants and ten (10) application servers can be considered, in which each application server stores static data of 200 MB per tenant. In this example, static data for each tenant has a memory footprint of 2,000 MB (200 MB per tenant per application server*10 application servers). In this example, a total memory footprint for all tenants across all application servers is 200,000 MB (200 MB per tenant per application server*100 tenants*10 application servers). If data storage is to be cleared, cleaned, and generated for a tenant, these actions need to be executed across all 10 application servers.

In view of the above context, implementations of the present disclosure provide load balancing of tenant requests to application servers in a cloud computing environment by assigning tenants to application server groups (also referred to as server groups herein). In some implementations, each server group includes one or more application servers assigned thereto, and each tenant is assigned to a server group. As described in further detail herein, when a request from a client of a tenant is received, the request is routed to the server group that the tenant is assigned to. In some examples, the request can be routed to a particular application server within the server group based on a scheduling policy (e.g., round-robin scheduling, modified round-robin scheduling).

As described in further detail herein, implementations of the present disclosure achieve one or more technical advantages. In some examples, the memory footprint to store static data in each application server is significantly reduced, because each application server stores static data for less than all tenants. Further, the number of application servers that execute memory clearing, cleaning, and generating operations for a tenant is reduced, because application servers that the tenant is not assigned to do not execute the operations for that tenant.

With regard to technical improvements, the above-introduced, non-limiting example of 100 tenants and 10 application servers can be considered, in which five (5) server groups are provided with two (2) application servers per server group, and the 100 tenants are evenly divided across server groups at 20 tenants per server group. In this non-limiting example, each application server stores a total of 4,000 MB of static data (200 MB per tenant*20 tenants). In this example, a total memory footprint for all tenants across all application servers is 40,000 MB (200 MB per tenant per application server*20 tenants*10 application servers), achieving an 80% reduction in the memory footprint of traditional approaches. Also in this example, if data storage (e.g., cache memory) is to be cleared, cleaned, and generated for a tenant, only 2 application servers execute this functionality, as compared to 10 application servers in traditional approaches.

FIG. 1 depicts an example architecture 100 in accordance with implementations of the present disclosure. In the depicted example, the example architecture 100 includes client devices 102, a network 106, and a server system 104. The server system 104 includes one or more server devices and databases 108 (e.g., processors, memory). In the depicted example, users 112 interact with the client devices 102. In the example of FIG. 1, a set of users 112 and respective client devices 102 can be associated with a first tenant 120 and a set of users 112 and respective client devices 102 can be associated with a second tenant 122.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes one or more servers 108. In the example of FIG. 1, the server system 104 is intended to represent various forms of servers including, but not limited to a web server, an application server, a proxy server, a network server, and/or a server pool. In general, server systems accept requests for services and provides such services to any number of client devices (e.g., the client device 102 over the network 106).

In some implementations, the server system 104 can embody a cloud computing environment, in which one or more of the servers 108 are application servers that receive requests, process the requests, and provide responses. For example, a server 108 can receive a request from the client device 102. In accordance with implementations of the present disclosure, and as described in further detail herein, requests are dispatched to servers 108 for handling based on server groups that respective tenants (e.g., the first tenant 120, the second tenant 122) are assigned to, each server group including one or more application servers.

Figure 2:
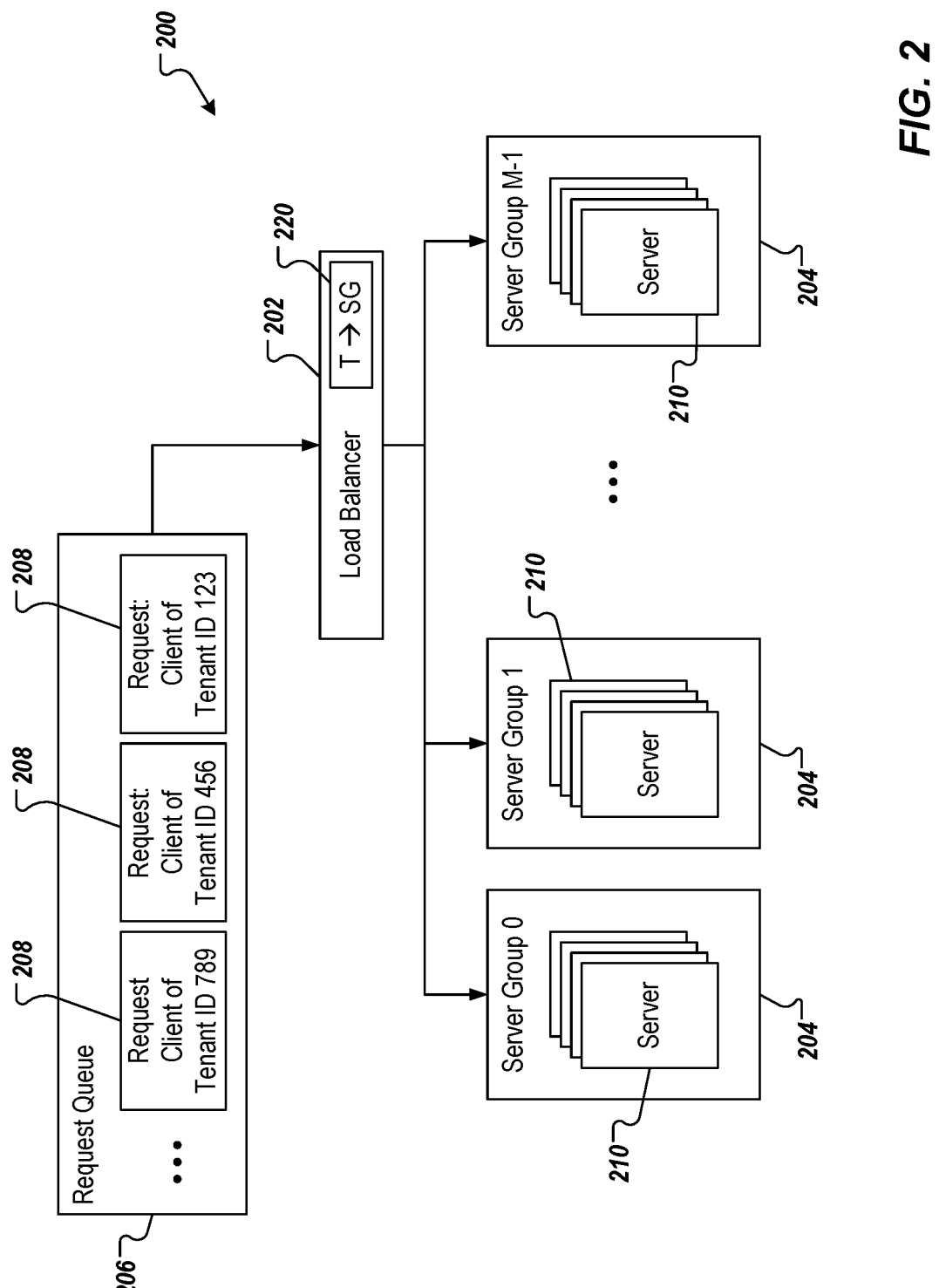
FIG. 2 depicts an example request handling architecture in accordance with implementations of the present disclosure.

FIG. 2 depicts an example request handling architecture 200 in accordance with implementations of the present disclosure. In some examples, the request handling architecture 200 of FIG. 2 is provided by the server system 104 of FIG. 1. In the example of FIG. 2, the request handling architecture 200 is depicted and includes a load balancer 202, server groups 204, and a request queue 206. The request queue 206 includes requests 208 issued from two or more tenants, which are to be routed to application servers 210 of respective server groups 204.

In further detail, each request 208 includes an identifier that uniquely identifies a tenant. The load balancer 202 includes a tenant (T) to server group (SG) mapping 220. The load balancer 202 determines which server group 204 to send the request to by querying the mapping 220 using the identifier of the tenant, the mapping 220 returning a server group identifier that uniquely identifies the server group 204 that the tenant is assigned to among all server groups 204. In some examples, the load balancer 202 transmits the request to the server group 204. In some examples, if the server group 204 includes multiple application servers 210, the load balancer 202 can apply a dispatch policy (e.g., round-robin scheduling, modified round-robin scheduling) to identify a specific application server 210 that the request is to be handled by or in the alternative, an additional load balancer can be associated with each server group where that additional load balancer can identify the specific application server 210 within the server group 204 to which to distribute the request.

Implementations of the present disclosure provide for distribution of tenant requests to server groups once the tenants are assigned to particular server groups. For example, the tenant assignment can be stored as a mapping of tenants to server groups (e.g., the mapping 220 of FIG. 2). As described in further detail herein, the assignment can be determined based on historical traffic data, the historical traffic data representing requests submitted by tenants over a previous traffic period. In some examples, the assignment is determined, is used, and is periodically updated to account for changes in traffic patterns since the last update or generation of the assignments.

In some implementations, when a new tenant is added, there is no historical traffic data for the new tenant. In some examples, the new tenant is assigned to the server group having the lowest traffic. When tenants are to be reassigned to server groups, the new tenant will be assigned with the other tenants to the server groups based on its historical traffic data since being added.

In some implementations, and as described in further detail herein, tenants can be assigned across server groups based on tenant traffic, which can be described as a number of tenant requests over a specified traffic period. Here, the number of tenant requests accounts for all requests from clients of a respective tenant over the specified traffic period. Tenant traffic in cloud-based systems (e.g., SaaS systems) typically follows some periodic law. As one non-limiting example, a human resource management (HRM) system can be considered, in which the traffic period of each tenant is one year and within the traffic period there is some sub-period (e.g., month) when the tenant traffic of the tenant is the largest (peak). As another non-limiting example, a business-to-consumer (B2C) electronic commerce (e-commerce) system can be considered, in which the traffic period of each tenant is one day and within the one day there is some sub-period (e.g., hour) when the tenant traffic of the tenant is the largest (peak). In each of these non-limiting examples, different tenants can reach peak traffic in different sub-periods.

In accordance with implementations of the present disclosure, for each application (e.g., HRM system, B2C e-commerce system), historical traffic data is retrieved and, for each tenant recorded in the historical traffic data, a set of parameters is generated. In some examples, the set of parameters includes, for each tenant, a tenant request count (tReqCnt) and a tenant peak time (tPkTime) within one traffic period (e.g., year, day). In some examples, the tenant request count is the total number of requests received from the respective tenant over the traffic period, and the tenant peak time is a sub-period (e.g., month, hour) that experienced the highest number of requests from the tenant.

In some implementations, tenants are assigned across server groups based on a set of guidelines. One example guideline includes that all server groups should have a similar number of tenants, if not the same number of tenants assigned thereto. Another example guideline is that all server groups should have a similar total request count (e.g., sum of tReqCnt of all tenants) within one traffic period for all tenants assigned thereto. Another example guideline is that tenants having the same or similar tenant peak times should be assigned evenly within one traffic period.

In view of these example guidelines, implementations of the present disclosure provide an algorithm for determining an assignment of tenants into server groups. More specifically, using the historical traffic data, a top count ($T_C$) is determined as the largest (MAX) tenant request count (tReqCnt) among all of the tenants. The tenants are divided into N tenant groups based on tenant request counts. In some examples, N can be set equal to the number M of server groups (e.g., N=M). However, if N is small, the tenant count of every tenant group may be not even. That is to say that, some tenant groups contain too many tenants and some tenant groups contain too few tenants. In such instances, N can be set larger to make the tenant count of every tenant group become more even. In some examples, a value of N is determined such that numbers of tenants in each tenant group are substantially equal. In some examples, substantially equal means that no tenant group X more tenants assigned thereto than any other tenant group (e.g., X=1, 2, 3).

Tenants in each tenant group are sorted and put in rank order based on respective tenant peak times. In some examples, the rank order is from earliest tenant peak time to latest tenant peak time. According to the order of the N tenant groups, tenants are assigned to server groups by rotation. Example pseudo-code is provided in Listing 2:

---

Listing 2: Example Tenant Assignment Pseudo-Code

---

```
Define integer i as 0, j as 0, k as 0
Define integer T_C as MAX(tReqCnt)
Define integer M as the count of server groups
Define array server_group[M] as all the server groups
Define integer N as the count of tenant groups
Define array tenant_group[N] as all the tenant groups
For every tenant in the cloud system:
    i = tReqCnt*N / T_C
    i = Math.min(i, N-1)
    Add tenant to tenant_group[i]
For i= 0, 1, 2, ..., (N-1)
    Sort tenant group[i] by tPkTime.
    For every tenant in tenant group[i]:
    k = j % M
    assign tenant to server_group[k]
    j++
```

---

In some implementations, the number of server groups M is determined based on balancing memory cost and availability for the tenants. For example, if M is relatively large, every server group contains a few servers and the memory costs is correspondingly low. In such a case, however, a tenant can only use a few servers, which might not support the traffic demands of the tenant. Further, if the server is down, there is a high probability that requests from the tenant will fail. As another example, if M is relatively small, every server group contains many servers. In this case, the memory cost is high, but each tenant can use many servers. Hence, if one server is down, there is a low probability that the requests from each tenant will fail. In view of this, the value of M can be configured based on by the following example conditions: (1) every server group can support the total traffic of its corresponding tenants; (2) every server group can ensure the failure rate is less than a threshold failure rate; and (3) if the two above conditions are satisfied, M can be as large as possible.

Figure 3:
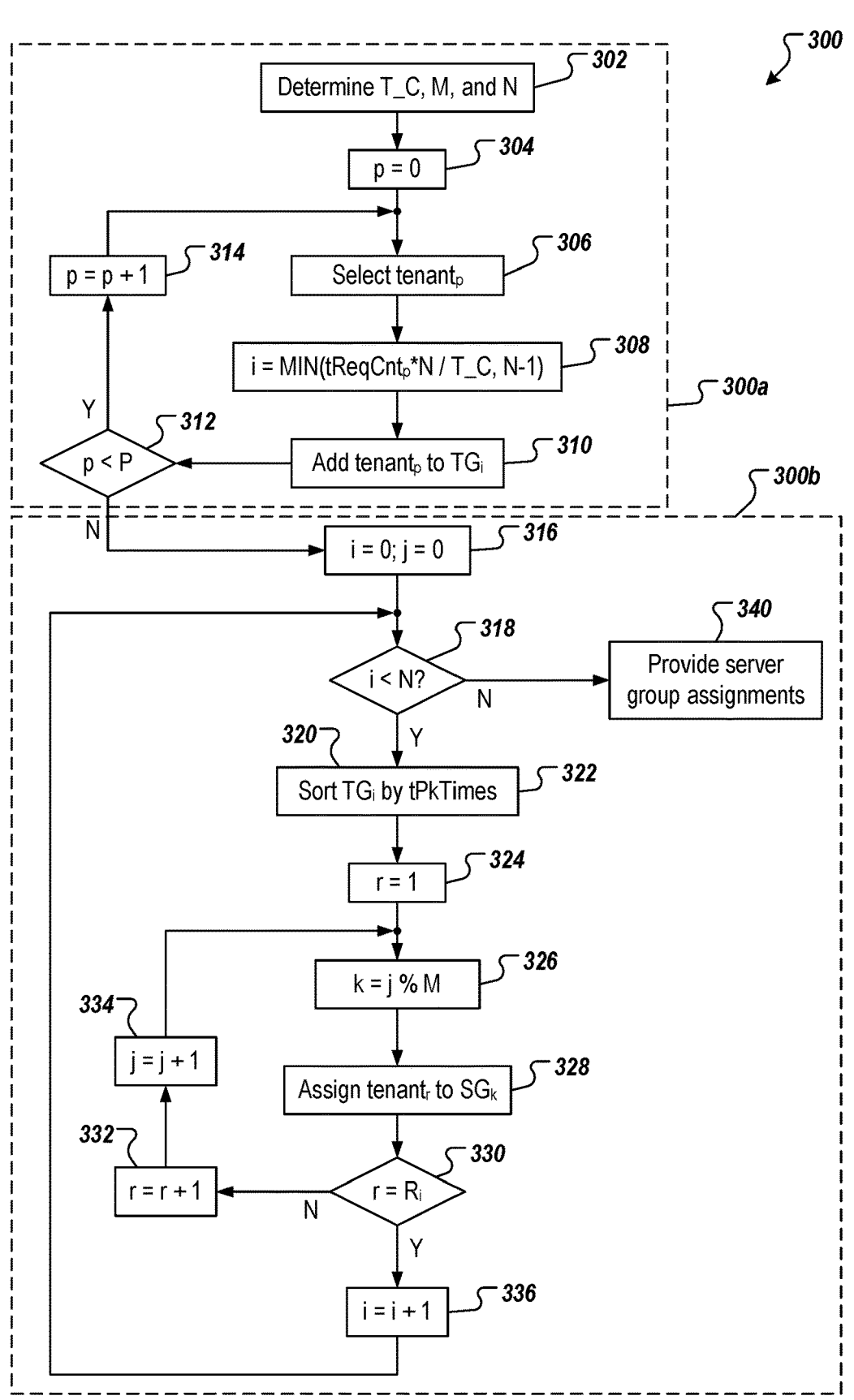
FIG. 3 depicts an example process that can be executed in accordance with implementations of the present disclosure.

FIG. 3 depicts an example process 300 that can be executed in accordance with implementations of the present disclosure. In some examples, the example process 300 is provided using one or more computer-executable programs executed by one or more computing devices.

A top count ($T_C$), a number (M) of server groups, and a number (N) of tenant groups are determined (302). For example, and as described herein, the top count is provided as the largest (MAX) tenant request count (tReqCnt) of all tenants in the historical traffic data, and M and N are predefined configuration values. A counter p is set equal to 0 (304). The $p^{th}$ tenant (tenant$_p$) is selected from the historical data (306) and a value i is determined for tenant (308). In some examples, the value i is selected as the minimum of either the product of the tReqCnt$_p$ (the tenant request count for tenant$_p$) and N divided by $T_C$, or N−1. For example:

$$i = \text{MIN}\left\{ RND_{down}\left(\frac{tReqCnt_p * N}{T_C}\right), N-1 \right\}$$

In some examples, the value i is a counter that indicates the $i^{th}$ tenant group ($TG_i$) in a set of tenant groups (e.g., $\mathbb{TG} = \{TG_0, \ldots, TG_{N-1}\}$). Numerical examples are described in further detail below. The tenant$_p$ is added to $TG_i$ (310) and it is determined whether p is less than P (312). For example, it is determined whether all tenants in the historical traffic data have been assigned to a tenant group, where the value P is the total number of tenants in the historical traffic data. If p is less than P, p is incremented (314) and the example process 300 loops back.

Processing elements (302)-(314) are shown grouped together in 300a. The general principle of processing elements (302)-(314) is to aggregate the tenants having an approximately similar size or scale in tenant request count (tReqCnt) together in the same tenant group. In other words, the tenants with lower tenant request counts (tReqCnt) should be in the same tenant group while tenants with middle tenant request counts (tReqCnt) should be in a different tenant group and tenants with higher tenant request counts (tReqCnt) should be placed in yet a different tenant group. This description should be understood to be relative and not absolute when assigning tenants to tenant groups. It should also be understood that different methods of assigning tenants to tenant groups using the total tenant request count over a period of time may be used in the alternative.

If p is not less than P, the counter i and a counter j are set equal to 0 (316). It is determined whether i is less than N (318). That is, it is determined whether all tenant groups have been considered in assigning tenants to server groups. If i is less than N, the tenants within the tenant group $TG_i$ are sorted based on respective tenant peak times (322). For example, and as described herein, tenants in $TG_i$ are sorted and put in rank order based on respective tenant peak times. In some examples, the rank order is from earliest tenant peak time to latest tenant peak time.

A counter r is set equal to 1 (324) and a value k is calculated (326). In some examples, the value k is an index that indicates the $k^{th}$ server group ($SG_k$) in a set of server groups (e.g., $\mathbb{SG} = \{SG_0, \ldots, SG_{M-1}\}$). In some examples, the value k is calculated as j modulo M (e.g., k=j % M). That is, the value k is set equal to the remainder of the quotient of j and M.

The $r^{th}$ tenant (tenant$_r$) of $TG_i$ is assigned to the $k^{th}$ server group ($SG_k$) (328) and it is determined whether r is equal to $R_i$ (330). In some examples, the value $R_i$ indicates the number of tenants in $TG_i$. Here, it is determined whether all tenants of tenant group $TG_i$ have been assigned to a server group. If r is not equal to $R_i$, r is incremented (332), j is incremented (334), and the example process 300 loops back to consider the next tenant in $TG_i$. If r is equal to $R_i$, i is incremented (336) and the example process 300 loops back to consider the tenant group, if there is any remaining tenant group to be considered.

If i is greater than or equal to N, all of the tenants have been assigned to a server group and the server group assignments are provided (340). For example, and as described herein with respect to FIG. 2, the assignment of tenants to server groups can be stored in the mapping 220 that is provided to the load balancer, where the load balancer 202 determines which server group 204 to send or distribute the request to by querying the mapping 220 using the identifier of the tenant, the mapping 220 returning a server group identifier that uniquely identifies the server group 204 that the tenant is assigned to among all server groups 204. In some examples, the load balancer 202 transmits the request to the server group 204. In some examples, if the server group 204 includes multiple application servers 210, the load balancer 202 can apply a dispatch policy (e.g., round-robin scheduling, modified round-robin scheduling) to identify a specific application server 210 within the server group 204 that the request is to be handled by. Processing elements (316)-(340) are also shown grouped together in 300b. The general principle of processing elements (316)-(340) is to assign a portion of each tenant group into the server groups such that no one server group has tenants assigned to it that predominantly share the same tenant peak times. As an example, and depending on the actual historical data received, a tenant group that has a plurality of tenants with the same tenant peak times (e.g., the $10^{th}$ month of the year), should, but not necessarily, have that plurality of tenants within the tenant group assigned to different server groups. This description should be understood to be relative and not absolute in assigning tenants from tenant groups to server groups. It should also be understood different methods of assigning tenants from tenant groups to server groups based on tenant peak times in a given time period may be used in the alternative. It should also be noted that different arrangements of FIG. 3 are also part of this invention. As an example, tenant groups could be determined using tenant peak times instead of total request counts. In such a scenario it follows that the assignment of tenants to server groups from tenant groups would be based on total tenant request counts. For example, tenants can be sorted in rank order by peak time (tPkTime) then divided into tenant groups by request counts (tReqCnt).

FIGS. 4A-4D depict tables representing an example assignment of tenants to server groups in accordance with implementations of the present disclosure. The example of FIGS. 4A-4D represent an example scenario, in which instances of a HRM system are executed on multiple application servers that are split into five (5) server groups, each server group including one or more application servers. In this example, the traffic period for each tenant is one year and the peak traffic time is designated as a month of the year. That is, each tenant is associated with a month indicating the tenant's peak traffic time (tPkTime). In this example, there are fifty (50) tenants considered with different request counts (tReqCnt, in billions of requests) and peak times (tPkTime, month) within one year. This is represented in a portion of a table 400 of FIG. 4A, which includes parameters for fifty (50) tenants (tenant0, . . . , tenant49).

FIG. 4B depicts a portion of a table 402 that represents segmentation of the 50 tenants into five (5) tenant groups (tenantGroup0, ..., tenantGroup4). The data shown in FIG. 4B is the result of executing the process elements of 300a shown in FIG. 3. As depicted in FIG. 4B, tenant groups can have an unequal number of tenants assigned thereto.

Figure 4A:
Figure 5A:
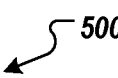

For purposes of non-limiting illustration, example assignments of tenants depicted in FIG. 4A to tenant groups depicted in FIG. 4B will be discussed. In these examples, N=5 and $T_C$=47. In these examples, tenant0 and tenant1 are considered, which have tReqCnts of 46 and 10, respectively. For tenant0, the index i is determined as:

$$i_{tenant0} = MIN \left\{ RND_{down} \left( \frac{46*5}{47} \right), \\ 5-1 \right.$$

$$i_{tenant0} = MIN \left\{ \frac{32}{4} \right.$$

$$i_{tenant0} = 4$$

Hence, tenant0 is assigned to tenantGroup4 (TG$_4$). For tenant1, the index i is determined as:

$$i_{tenant1} = MIN \left\{ RND_{down} \left( \frac{10*5}{47} \right), \\ 5-1 \right.$$

$$i_{tenant1} = MIN \left\{ \frac{1}{4} \right.$$

$$i_{tenant1} = 1$$

Hence, tenant1 is assigned to tenantGroup4 (TG$_1$).

FIG. 4C depicts a portion of a table 404 that represents rank ordering of tenants within tenant groups (e.g., from earliest to latest in terms of tenant peak times). The data shown in FIG. 4C can be the result of executing (322) shown in FIG. 3 for each tenant group. FIG. 4D depicts a portion of a table 406 that represents assignments of tenants to five (5) server groups (serverGroup0, ..., serverGroup4). In the example of FIG. 4D, the server groups have an equal number of tenants assigned thereto, based on this example data but a different dataset (e.g., 52 tenants being assigned into 5 server groups) would yield server groups of unequal tenants (e.g., 3 server groups would have 10 tenants assigned and 2 server groups would have 11 tenants assigned). It is a general principle, however, that the server groups should have substantially similar numbers of tenants assigned to them. Further, each server group has a similar total tenant request count (e.g., 237, 250, 265, 264, for serverGroup0, serverGroup1, serverGroup3, serverGroup4, respectively (serverGroup2 not being depicted for purposes of reducing table size). It is not a requirement of this invention that each server group have the same number of total tenant request count. The data shown in FIG. 4D can be the result of executing the process elements of 300b shown in FIG. 3.

FIGS. 5A-5D depict tables representing another assignment of tenants to server groups in accordance with implementations of the present disclosure. The example of FIGS. 5A-5D represent an example scenario, in which instances of a B2C e-commerce system are executed on multiple application servers that are split into six (6) server groups, each server group including one or more application servers. In this example, the traffic period for each tenant is one day (e.g., 24 hour period, 0-23 hours) and the peak traffic time is designated as an hour of the day. That is, each tenant is associated with an hour indicating the tenant's peak traffic time (tPkTime). In this example, there are eighty (80) tenants considered with different request counts (tReqCnt, in millions of requests) and peak times (tPkTime, hour) within one day. This is represented in a portion of a table 500 of FIG. 5A, which includes parameters for eighty (80) tenants (tenant0, ..., tenant79).

FIG. 5B depicts a portion of a table 502 that represents segmentation of the 80 tenants into eight (8) tenant groups (tenantGroup0, ..., tenantGroup7). The data shown in FIG. 5B can be the result of executing process elements 300a shown in FIG. 3. As depicted in FIG. 5B, tenant groups can have an unequal number of tenants assigned thereto. FIG. 5C depicts a portion of a table 504 that represents rank ordering of tenants within tenant groups (e.g., from earliest to latest in terms of tenant peak times). The data shown in FIG. 5C can be the result of executing the processing element (322) of FIG. 3 for each tenant group. FIG. 5D depicts a portion of a table 506 that represents assignments of tenants to six (6) server groups (serverGroup0, ..., serverGroup5). In the example of FIG. 5D, the server groups have a similar number of tenants assigned thereto. Further, each server group has a similar total tenant request count (e.g., 687, 732, 685, for serverGroup0, serverGroup1, serverGroup2, serverGroup3, serverGroup4 not being depicted for purposes of reducing table size). The data shown in FIG. 5D can be the result of executing the process elements 300b shown in FIG. 3.

Figure 6:
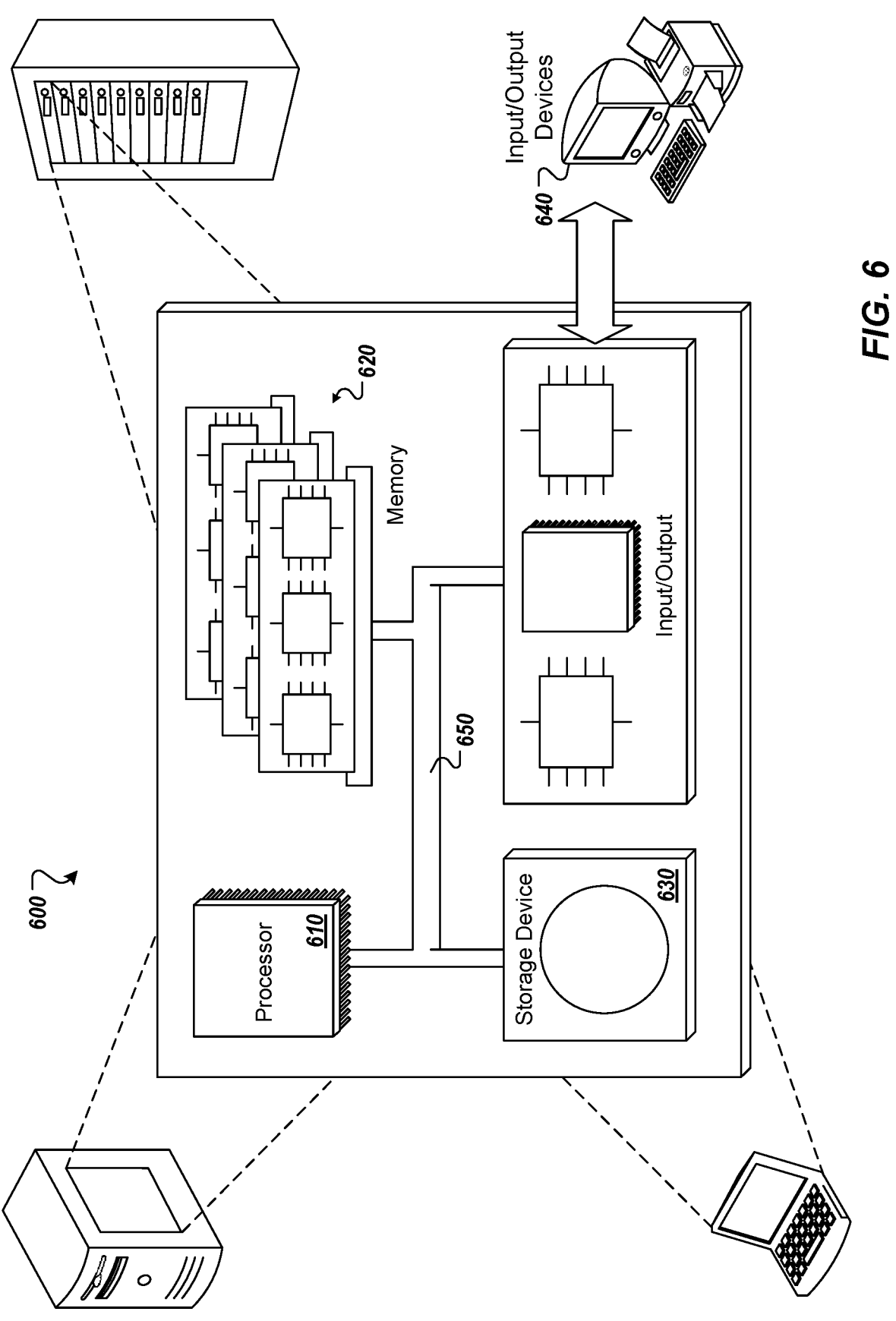
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. The components 610, 620, 630, 640 are interconnected using a system bus 650. The processor 610 is capable of processing instructions for execution within the system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the system 600. In some implementations, the memory 620 is a computer-readable medium. In some implementations, the memory 620 is a volatile memory unit. In some implementations, the memory 620 is a non-volatile memory unit. The storage device 630 is capable of providing mass storage for the system 600. In some implementations, the storage device 630 is a computer-readable medium. In some implementations, the storage device 630 may be a floppy disk device, a hard disk device, an optical disk device, or a tape device. The input/output device 640 provides input/output operations for the system 600. In some implementations, the input/output device 640 includes a keyboard and/or pointing device. In some implementations, the input/output device 640 includes a display unit for displaying graphical user interfaces.

The features described can be implemented in digital electronic circuitry, or in computer hardware, firmware, software, or in combinations thereof. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method executed by one or more processors and comprising:

receiving a first request parameter for each of a plurality of tenants;

receiving a second request parameter for each of the plurality of tenants; and load balancing tenant requests of tenants in the plurality of tenants to servers of a plurality of servers based on M plurality of server groups, wherein:

the plurality of tenants is associated with N plurality of tenant groups based on the first request parameter for each of the plurality of tenants, each tenant in the N plurality of tenant groups is associated with a server group in the M plurality of server groups based on the second request parameter for each of the plurality of tenants, and each tenant group (i) for each tenant (p) in the association of the plurality of tenants with the N plurality of tenant groups comprises:

$$i = \text{MIN} \left\{ RND_{down} \left( \frac{\left( \frac{tReqCnt_p * N}{T_C} \right)}{N-1} \right), \right.$$

wherein $tReqCnt_p$ is the first request parameter for the tenant (p) and $T_C$ is a largest (MAX) tenant request count for all tenants in the plurality of tenants.

2. The computer-implemented method of claim 1, wherein the first request parameter is a request count for each of the plurality of tenants over a period of time.

3. The computer-implemented method of claim 1, wherein the second request parameter is a peak time of requests for each tenant over a period of time.

4. The computer-implemented method of claim 1, wherein the association of the plurality of tenants of the N plurality of tenant groups with the M plurality of server groups comprises, for each tenant (j) within a tenant group (i), a server group (k) being based on j modulo M.

5. The computer-implemented method of claim 1, wherein a value of N is based on no tenant group X having more associated tenants than any other tenant group.

6. The computer-implemented method of claim 1, further comprising:

receiving a request from a first tenant of the plurality of tenants; and distributing the request from the first tenant to a first server group of the M plurality of server groups to which the first tenant is associated.

7. A non-transitory computer-readable storage medium coupled to one or more processors and having instructions stored thereon which, when executed by the one or more processors, cause the one or more processors to perform operations comprising:

receiving a first request parameter for each of a plurality of tenants;

receiving a second request parameter for each of the plurality of tenants; and load balancing tenant requests of tenants in the plurality of tenants to servers of a plurality of servers based on the M plurality of server groups, wherein:

the plurality of tenants is associated with N plurality of tenant groups based on the first request parameter for each of the plurality of tenants, each tenant in the N plurality of tenant groups is associated with a server group in the M plurality of server groups based on the second request parameter for each of the plurality of tenants, and each tenant group (i) for each tenant (p) in the association of the plurality of tenants with the N plurality of tenant groups comprises:

$$i = \text{MIN} \left\{ RND_{down} \left( \frac{\left( \frac{tReqCnt_p * N}{T_C} \right)}{N - 1} \right), \right.$$

wherein $tReqCnt_p$ is the first request parameter for the tenant (p) and To is a largest (MAX) tenant request count for all tenants in the plurality of tenants.

8. The non-transitory computer-readable storage medium of claim 7, wherein the first request parameter is a request count for each of the plurality of tenants over a period of time.

9. The non-transitory computer-readable storage medium of claim 7, wherein the second request parameter is a peak time of requests for each tenant over a period of time.

10. The non-transitory computer-readable storage medium of claim 7, wherein the association of the plurality of tenants of the N plurality of tenant groups with the M plurality of server groups comprises, for each tenant (j) within a tenant group (i), a server group (k) being based on j modulo M.

11. The non-transitory computer-readable storage medium of claim 7, wherein a value of N is based on no tenant group X having more associated tenants than any other tenant group.

12. The non-transitory computer-readable storage medium of claim 7, wherein operations further comprise:

receiving a request from a first tenant of the plurality of tenants; and distributing the request from the first tenant to a first server group of the M plurality of server groups to which the first tenant is associated.

13. A system, comprising:

a computing device; and a computer-readable storage device coupled to the computing device and having instructions stored thereon which, when executed by the computing device, cause the computing device to perform operations comprising:

receiving a first request parameter for each of a plurality of tenants;

receiving a second request parameter for each of the plurality of tenants; and load balancing tenant requests of tenants in the plurality of tenants to servers of a plurality of servers based on M plurality of server groups, wherein:

the plurality of tenants is associated with N plurality of tenant groups based on the first request parameter for each of the plurality of tenants, each tenant in the N plurality of tenant groups is associated with a server group in the M plurality of server groups based on the second request parameter for each of the plurality of tenants, and each tenant group (i) for each tenant (p) in the association of the plurality of tenants with the N plurality of tenant groups comprises:

$$i = \text{MIN} \left\{ RND_{down} \left( \frac{\left( \frac{tReqCnt_p * N}{T_C} \right)}{N - 1} \right), \right.$$

wherein $tReqCnt_p$ is the first request parameter for the tenant (p) and $T_C$ is a largest (MAX) tenant request count for all tenants in the plurality of tenants.

14. The system of claim 13, wherein the first request parameter is a request count for each of the plurality of tenants over a period of time.

15. The system of claim 13, wherein the second request parameter is a peak time of requests for each tenant over a period of time.

16. The system of claim 13, wherein the association of the plurality of tenants of the N plurality of tenant groups with the M plurality of server groups comprises, for each tenant (j) within a tenant group (i), a server group (k) being based on j modulo M.

17. The system of claim 13, wherein a value of N is based on no tenant group X having more associated tenants than any other tenant group.

\* \* \* \* \*